United States Patent
Paripally et al.

(10) Patent No.: US 9,743,039 B2
(45) Date of Patent: Aug. 22, 2017

(54) IMMERSIVE TELEPRESENCE ANYWHERE

(71) Applicant: Polycom, Inc., San Jose, CA (US)

(72) Inventors: Gopal Paripally, Austin, TX (US); Stephen Botzko, Reading, MA (US)

(73) Assignee: Polycom, Inc., San Jose, CA (US)

( * ) Notice: Subject to any disclaimer, the term of this patent is extended or adjusted under 35 U.S.C. 154(b) by 0 days.

(21) Appl. No.: 15/336,568

(22) Filed: Oct. 27, 2016

(65) Prior Publication Data

US 2017/0048486 A1   Feb. 16, 2017

Related U.S. Application Data

(63) Continuation of application No. 14/931,603, filed on Nov. 3, 2015, now Pat. No. 9,503,689, which is a continuation of application No. 14/209,327, filed on Mar. 13, 2014, now Pat. No. 9,215,406.

(60) Provisional application No. 61/783,227, filed on Mar. 14, 2013.

(51) Int. Cl.
*H04N 7/15* (2006.01)
*H04N 7/14* (2006.01)

(52) U.S. Cl.
CPC ............. *H04N 7/142* (2013.01); *H04N 7/147* (2013.01); *H04N 7/148* (2013.01); *H04N 7/15* (2013.01)

(58) Field of Classification Search
CPC ........... H04N 7/152; H04N 7/15; H04N 7/147
See application file for complete search history.

(56) References Cited

U.S. PATENT DOCUMENTS

| | | |
|---|---|---|
| 5,568,359 A | 10/1996 | Cavello et al. |
| 6,593,956 B1 | 7/2003 | Potts et al. |
| 6,912,178 B2 | 6/2005 | Chu et al. |
| 7,554,571 B1 | 6/2009 | Beck et al. |
| 7,907,164 B2 | 3/2011 | Kenoyer et al. |
| 8,072,481 B1 | 12/2011 | McNelley et al. |
| 8,248,448 B2 | 8/2012 | Feng et al. |
| 8,279,258 B2 | 10/2012 | Ichieda |
| 8,773,495 B2 | 7/2014 | Saleh et al. |
| 8,957,937 B2 | 2/2015 | Wang et al. |
| 2005/0007445 A1 | 1/2005 | Foote et al. |
| 2006/0244817 A1 | 11/2006 | Harville et al. |
| 2007/0279484 A1 | 12/2007 | Derocher et al. |
| 2007/0285561 A1 | 12/2007 | Chen |
| 2008/0278894 A1 | 11/2008 | Chen et al. |
| 2010/0216508 A1 | 8/2010 | Ma et al. |
| 2011/0181685 A1 | 7/2011 | Saleh et al. |
| 2011/0193934 A1 | 8/2011 | Roberts et al. |
| 2011/0211036 A1 | 9/2011 | Tran |
| 2011/0264835 A1 | 10/2011 | Chen et al. |
| 2012/0056973 A1 | 3/2012 | Yano |
| 2012/0274733 A1 | 11/2012 | Yano |
| 2013/0010053 A1 | 1/2013 | Daddi |
| 2013/0188007 A1 | 7/2013 | Duong |
| 2014/0146129 A1 | 5/2014 | Ye et al. |

*Primary Examiner* — Christopher M Brandt
(74) *Attorney, Agent, or Firm* — Blank Rome, LLP

(57) ABSTRACT

A portable immersive telepresence conferencing system which can capture audio data and video data and communicate at least some of the captured data to at least one remote endpoint via a network interface, receive image data and audio data from at least one remote source via the network interface and render a depiction of at least one object, which is substantially the same size of the actual object being shown.

20 Claims, 3 Drawing Sheets

IMMERSIVE TELEPRESENCE ANYWHERE

CROSS-REFERENCE TO RELATED APPLICATION

This application is a continuation of U.S. application Ser. No. 14/931,603, filed Nov. 3, 2015 and issued as U.S. Pat. No. 9,503,689, which is a continuation of U.S. application Ser. No. 14/209,327, filed Mar. 13, 2014 and issued as U.S. Pat. No. 9,215,406, which claims priority to U.S. Provisional Application No. 61/783,227, filed Mar. 14, 2013, the contents of which applications are fully incorporated by reference herein.

BACKGROUND

As videoconferencing technology has improved, it has come to be more widely deployed. One problem that has historically existed with videoconferencing technology is that the technology interferes with the conferencing experience. Small screen sizes, low quality video, and low quality audio were the norm and created barriers to personal interaction that do not appear in face-to-face meetings. Immersive telepresence ("ITP") systems, which employ a combination of large screens, high quality video, and high quality audio have been developed to overcome these advantages.

One such system is described in U.S. Pat. No. 8,773,495, entitled Integrated System for Telepresence Videoconferencing. Such systems include numerous features designed to enhance the user's interaction experience. For example, multiple cameras and codecs coupled with relatively large screens allow the remote participants to appear very near their actual size. This, coupled with high quality video can give the feeling of a face-to-face meeting. Many such systems also employ custom furniture that is very similar at the local and remote endpoints. This, too helps provide the illusion of a face-to-face meeting. Other features, such as high fidelity audio dedicated presentation screens, and the like also contribute to the enhanced conferencing experience delivered by ITP systems.

However, one drawback of today's ITP systems is that they are very expensive. Such systems can often cost on the order of $1,000,000. Another disadvantage is that such systems also require complex system set up, a time consuming process to install (as much as 3-6 months) and expensive maintenance. Another disadvantage is that the conference rooms used for immersive telepresence conferencing require substantially dedicated real estate (around 30×25 ft). As a result of these drawbacks, one commercial ITP system, Polycom's RPX—Real Presence Experience, provides all of the benefits outlined above, but is only available for about 0.001% of videoconferencing users because of its cost, complexity, and lack of portability.

On the other hand, relatively simple, low cost, and portable conferencing solutions exist. Many of these solutions are starting to provide high quality audio and video that rival the ITP systems. An example of such a system is Polycom's Real Presence Mobile application, which brings high quality videoconferencing to portable devices, such as laptop computers, tablet computers, and smart phones. Polycom Real Presence Mobile can solve problems for people connecting and collaborating face-to-face using HD audio, video and content sharing with colleagues and partners from any one, any where. However, Polycom's Real Presence Mobile solution cannot—by itself—provide an immersive telepresence experience because of the very small screen size on mobile platforms and because of the relatively poor eye contact such systems allow. Rendering far end video on mobile platforms such as an iPhone or tablet computer allows a user to hear and see things at a remote site, but does not create the feeling of "being there" one would get from a true ITP system.

SUMMARY

A conferencing peripheral for use with a mobile device or laptop or desktop computer can include one or more of projectors, cameras, microphones, and speakers. Such a device can work with the mobile device to provide a higher quality conferencing experience than has been provided to date by projecting a substantially full size, high resolution, image of conference participants onto a screen or wall and by providing microphones, speakers, and sufficient audio processing to provide high fidelity audio as part of the conferencing experience. The peripheral may be configured to use the voice and/or data network of the mobile device or may include its own internal network interface.

BRIEF DESCRIPTION OF THE DRAWINGS

Exemplary embodiments of the present invention will be more readily understood from reading the following description and by reference to the accompanying drawings, in which.

DETAILED DESCRIPTION

Described herein are apparatus, systems, and methods for expanding a portable conferencing experience, such as that provided by Polycom's Real Presence Mobile to provide an enhanced conferencing experience. One aspect of providing this experience is the size at which remote participants appear. The inventors have determined that to have a life-like real presence experience, objects (such as remote participants) need to be rendered at least 50% of their true size on a video display located at a reasonable meeting/social distance, which inventors have determined to be about 5 to 10 feet. Obviously this cannot be accomplished with the displays of smart phones, tablets, portable computers, or even—in many cases—desktop computers. However, recent developments in so-called "pico projection technology" (a/k/a handheld, pocket, or mobile projectors) can facilitate a portable ITP experience. By providing a pico projector that can be used in conjunction with a high-quality videoconferencing application on a portable device (such as a mobile phone, tablet computer, laptop computer, or the like) a user can project the far-side participants of a call on a wall or other suitable surface to achieve aforementioned size and distance parameters necessary for an ITP experience.

The implementation details of various pico projection technologies are not pertinent to the inventive concepts described herein. Various solutions have been developed based on digital light processing (DLP), beam-steering, and liquid crystal on silicon ("LCoS") technologies. It is envisioned that any of these or other pico projection technologies could be used in implementing the apparatus, methods, techniques, and systems described herein. It should be noted that one additional advantage of these various technologies is that their relatively low cost (as compared to traditional ITP systems) will improve the availability of immersive telepresence solutions.

Figure 1:
FIG. 1 illustrates one embodiment of an immersive telepresence conferencing peripheral.

Illustrated in FIG. 1 is one example of a conferencing peripheral 101 that can be used to deliver a low-cost, portable, immersive telepresence experience. Conferencing peripheral 101 is illustrated as a triangular peripheral designed to connect with a smartphone 102. The conferencing peripheral can be disposed, for example, on a tabletop (or other suitable surface) 103 and oriented to project an image 104 of one or more remote participants on a wall (or other suitable surface) 105. Further aspects of conferencing peripheral 101 will now be discussed with reference to FIG. 2, which shows enlarged views of the conferencing peripheral 101. View 101a is a perspective "front" view of the peripheral, while view 101b is a "rear" view of the same device. It should be noted that the terms "front" and "rear" in this context are somewhat arbitrary and are selected so that the "front" is facing the user with the "rear" pointed towards the projection surface in normal operation.

Figure 2:
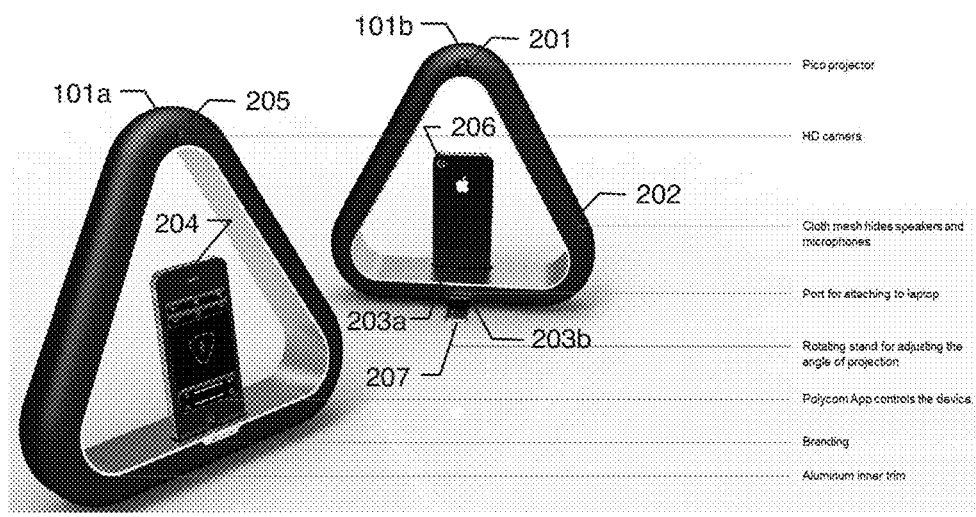
FIG. 2 illustrates further details of an immersive telepresence conferencing peripheral.

In the illustrated embodiment, peripheral 101 can be built from a substantially triangular frame. The frame can be constructed from molded plastic in one or more interlocking segments. The frame can also be hollow, allowing for various electronic components discussed below to be enclosed therein. As shown in FIG. 2, rear view 102b, the device can include a pico projector 201 located at an upper vertex of the conferencing peripheral. The projector can be controlled to project a video image 104 on the screen/wall 105. In some embodiments the projected image 104 can scale in resolution and size, for example from 480p to 1920p and 36 to 86 inches or more, depending on how far the projecting surface (wall) 105 is from the location of the unit. Distance to the wall 105 (projecting surface) can be calculated by using IR/ultrasonic reflection sensors on the unit (not shown). This can allow the image to be auto scaled as appropriate to create an ITP experience.

At one or more locations around the frame, the molded plastic making up the frame can be constructed with a plurality of openings, forming a "mesh grille" 202 that allows one or more microphones and one or more speakers to be disposed within the frame. Alternatively, one or more openings in the frame may be covered with a fabric mesh to achieve the same effect.

In some embodiments, it may be desirable to include a plurality of microphones within the frame. This can allow the device to employ beam forming or other positional audio techniques that enhance the conferencing experience. A discussion of the details of implementing such an arrangement can be found in U.S. Pat. Nos. 6,593,956 and 6,912,178. Such data can be used for a variety of activities, including camera framing (discussed further below). Details of a positional audio based camera framing are described in U.S. Pat. No. 8,248,448. Additionally, multiple microphones could be used as part of an enhanced echo cancellation scheme, noise cancellation or various other conferencing applications for which the use of multiple microphones is necessary or advantageous.

Similarly, it may be desirable to include multiple speakers behind the speaker grilles. These multiple speakers can be used in many ways to enhance the conferencing experience. For example, they can be used to provide stereo audio that corresponds to the location of a speaker, as described further below.

Conferencing peripheral 101 can also include one or more cameras 205. To facilitate the high quality video traditionally associated with telepresence conferencing, camera 205 is preferably a high definition camera. Additionally, further camera elements could also be included and aimed so as to provide a variety of conference experiences. For example, cameras could be located at each of the remaining vertices of the conferencing peripheral 101 and aimed to capture participants sitting to either side of the primary participant, further enhancing the telepresence experience. Alternatively, one or more additional cameras could be configured as document or exhibit cameras, allowing the local participant to show a document or other item to the far-end participants without disrupting display of the local participant's image. Additionally, the cameras can be enabled with electronic pan, tilt, and zoom functionality allowing for optimal framing of the image transmitted to the far end.

Further components of the conferencing peripheral 101 include one or more conferencing device interfaces. The illustrated embodiment includes two such interfaces. A first interface 203a can be disposed inside the periphery of the triangular body of the peripheral 101 and can be configured to receive a smart phone, personal digital assistant, tablet computer, or similar device 204. Collectively these devices, as distinguished from laptop or desktop computers and the like, will be described as mobile devices. In some embodiments conferencing software running on the device (such as Polycom's Real Presence Mobile) can be used to control the various features and operation of the device. Interface 203a is illustrated as a docking cradle type interface, but other interfaces, including wireless interfaces are also contemplated.

Depending on the capabilities of the mobile device 204, its own camera(s), microphone(s), speaker(s) and/or screen (s) can be used in addition to or in place of camera(s), microphone(s), speaker(s) and/or projector(s) of the peripheral. For example, it might be desirable to use the microphone(s) of the mobile device 204 as an adjunct or substitute for the microphones in the peripheral 101. The same goes for speakers and cameras. For example, a back-side camera 206 of the mobile device 204 could serve as a very effective document camera for showing a shared paper document to the remote participants. This is particularly so for mobile devices that include a high resolution back side camera. In an embodiment in which certain functionality is provided by the mobile device (or notebook/desktop computer), such as camera(s), microphone(s) or speaker(s), such components could be omitted from the conferencing peripheral 101.

Similarly, a display screen of the mobile device 204 could be used as an adjunct to the images projected by projector 201. For example, it might be useful to display content being presented by a remote participant using the mobile device screen so that both the remote participant and the content are visible at the same time. Alternatively, the mobile device screen and associated inputs (e.g., a touch screen or wireless device) could be used by the local participant to manage content being presented at the far end. In yet another alternative, the display screen of the mobile device could be used to display one (or more) participants in a multi point call, while the projected image(s) are used to display other participants.

In some embodiments, the networking capabilities of mobile device 204, for example a cellular voice or data network, 802.11 wireless network (a/k/a "Wi-Fi"), can be used to complete the call. Alternatively, the peripheral 101 could include a separate wired or wireless network interface. This could either be its own separate interface, or part of an additional interface 203b used for connecting to a notebook or desktop computer or the like. This additional interface could be, for example, a universal serial bus (USB) or IEEE 1395 (a/k/a "Firewire") interface, a wired or wireless Ethernet interface, or other suitable interface. When used in conjunction with a notebook or desktop computer and alternate interface 203b, the device could function in substantially the same manner, with software on the computer serving as the controller for the unit. As with mobile device 204, the I/O devices of the computer (camera(s), speaker(s), microphone(s), display(s), network interface(s) and the like) could also be used as replacements for or adjuncts to such devices integral with the conferencing peripheral 101.

Further illustrated in FIG. 2, conferencing peripheral can include an adjustable stand 207. This adjustable stand 207 can be used to adjust the angle of the device with respect to the surface 103 on which it rests, thereby adjusting the angle of projection as well as the angle of the cameras integrated with the peripheral and as part of mobile device 204. Not shown is a power interface, which can take a variety of forms, including internal batteries or a power adapter for connecting to AC mains power.

Figure 3:
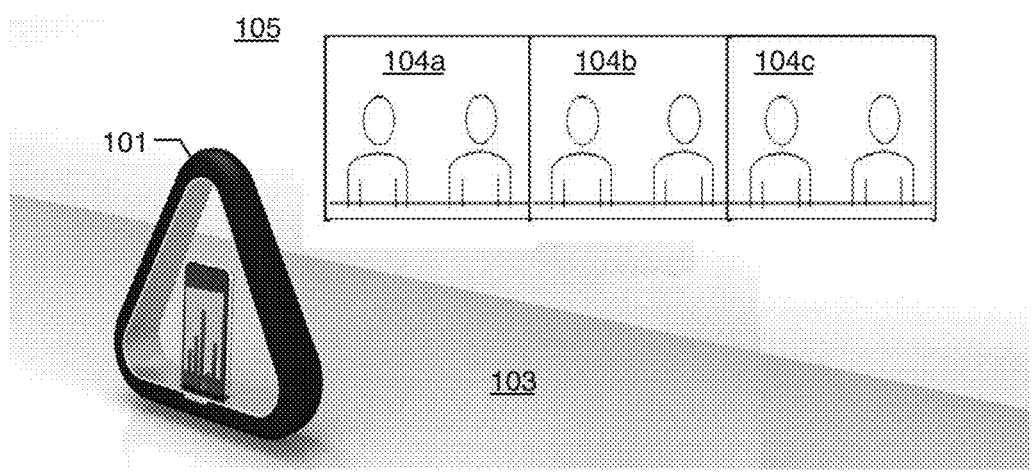
FIG. 3 illustrates an immersive telepresence conferencing peripheral providing a simulated multi-screen experience.

Illustrated in FIG. 3 is an alternative embodiment in which multiple projectors are used create the experience of a multi-screen telepresence system. In the illustrated example three projectors (not shown), are used to generate three display images 104a, 104b, and 104c. In one embodiment, the individual projectors can be located in vertices of the triangle (left, right and top) and can be used to show left, right and middle screens (images) on wall 105. Such a system need not be limited to three screens and can be extended to have any desired number of screens. Additionally, the projectors can be located at any convenient location depending on device form factors. There is no requirement that they be located at vertices of the triangle.

Figure 4:
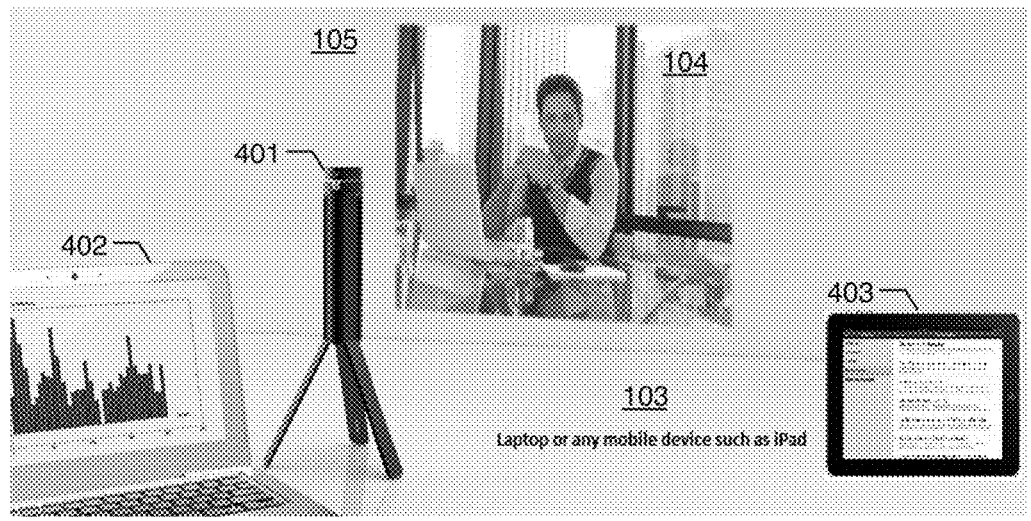
FIG. 4 illustrates an alternative embodiment of an immersive telepresence conferencing peripheral.

Illustrated in FIG. 4 is an alternative to the embodiment described above. A portable conferencing unit 401 can be configured to work more independently of the connected mobile device or notebook/desktop computer platform. Such a device can include similar elements to the previously described embodiment (i.e., one or more projectors and also, potentially one or more of camera(s), projector(s), microphone(s), etc.). Portable conferencing unit 401 could also include additional conferencing hardware and a network interface.

Figure 5:
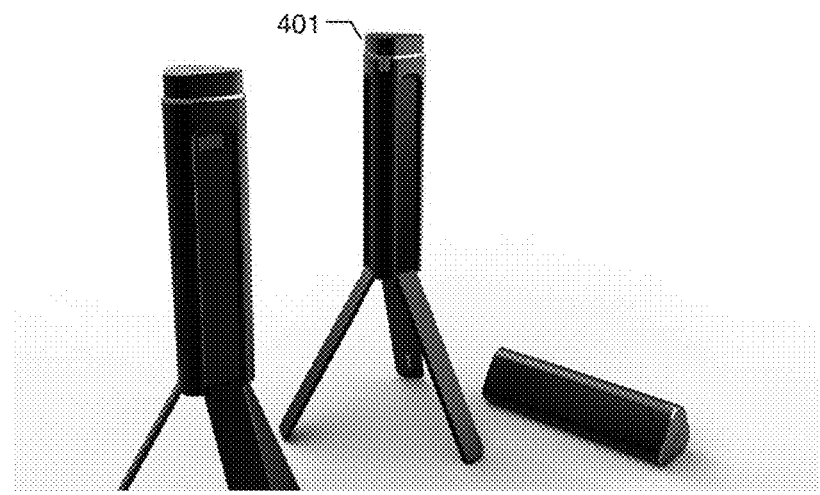
FIG. 5 illustrates further details of the immersive telepresence conferencing peripheral illustrated in FIG. 4.

Portable conferencing unit 401 can be configured to stand on table 103 substantially at eye level. This facilitates a realistic perspective for the user, both because the camera will be able to capture the image of the local user at a natural angle and because the projected image of the far end participants will not require excessive keystone correction. A projector on the opposite side of the unit (not shown) can project video 104 from a connected laptop (or desktop) computer 402 or a tablet computer 403 (or other mobile device) onto the wall 105. In one embodiment, microphones and/or speakers can be included in the main body or can be disposed in recesses in the tripod legs. As illustrated in FIG. 5, portable conferencing unit 401 can be constructed with folding tripod legs that can fold up against the device for transportation and storage.

In any of the illustrated embodiments, the unit/stand (with camera) can adjust the size and height of the projected image to facilitate better eye contact of the person presenting. As noted above, it may be desirable that the size of the participants be at least 50% of actual size and projected on a surface about 5 to 10 feet away. It may also be desirable to project the remote participants at such a height on the wall that the position of the eyes of the remote participants is approximately collinear with the eyes of the local participant and the camera of the conferencing peripheral or other camera used to capture the image of the local participant. Eye position of both the local and remote participants can be determined by a face recognition algorithm applied to the local and remote video streams. Approximate collinearity of the eyes of the local and remote participants and the local image sensor can be determined on a case-by-case basis. In general, it has been found that when an angle formed by the local participant's eyes, the remote participant's eyes, and the local image sensor is less than 10 degrees, and preferably less than about 5 degrees, a sufficient perception of direct eye contact is created.

Figure 6:
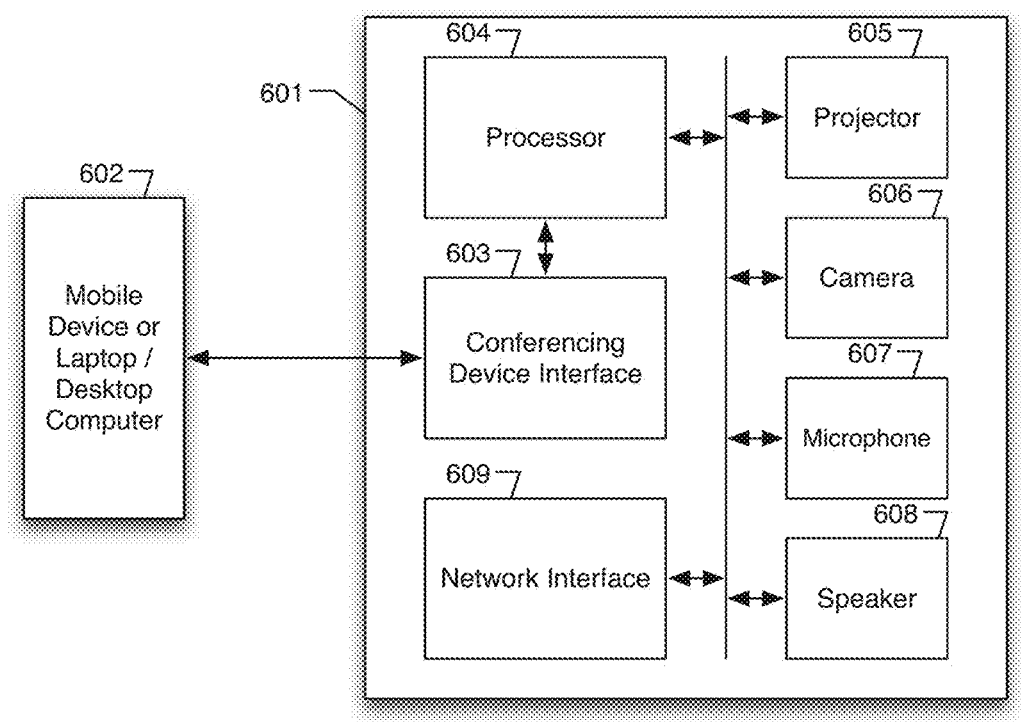
FIG. 6 illustrates a schematic diagram of the internal electronics of an immersive telepresence conferencing peripheral.

Illustrated in FIG. 6 is a block diagram schematically depicting the various components of a conferencing peripheral 601 according to the various embodiments described herein. Conferencing peripheral can be communicatively coupled to a mobile device, laptop, or desktop computer 602 (hereinafter portable device 602) via a conferencing device interface 603. As noted above, the conferencing device interface may be a wired connection such as a serial link. Alternatively, it could be a wireless connection. Conferencing peripheral 601 is controlled internally by processor 604; however, the system can be designed so that much of the processing takes place on mobile device 602 under the direction of program code stored in a memory and executed by a processor of the mobile device. Depending on the details of implementation, processor 604 may be a relatively powerful and fully featured microprocessor or DSP or may be a relatively simple processor that is basically providing an interface to the various components of conferencing peripheral 601. In such embodiments, peripheral interface 603 could be separate or could be integrated with processor 604.

Processor 604 communicates with one or more additional components, including projector 605, camera 606, microphone 607, and speaker 608. Multiples of each of these devices may be supplied. Alternatively, some of these devices may be omitted depending on the particular embodiment. As depicted in FIG. 6, each of these components communicates with the processor via a common bus. However, depending on the details, they may require their own additional interface circuitry (not shown) or they may communicate directly with the portable device 602 via the conferencing device interface. Processor 604 can optionally communicate with a memory storing computer instructions for execution by processor 604. Additionally, with modern system on a chip (SoC) technology one or more of conferencing device interface 603, network interface 609, and the interface circuitry for connection with projector 605, camera 606, microphone 607, and/or speaker 608 could all be integrated with processor 604.

Peripheral 601 could be configured as a completely freestanding conferencing device, in which case the portable device 602 would not be required for conferencing functionality. In that case conferencing device interface 603 might be omitted or might be provided merely as a way for supplemental use of portable device 602, such as providing conference content. In such embodiments, a network interface 609 might be provided to facilitate connection to remote endpoints. Even in embodiments in which mobile device 602 and its network connection are used for conferencing, it might be desirable to provide an auxiliary network interface to enable other functionality.

The above description is illustrative and not restrictive. Many variations of the invention will become apparent to those skilled in the art upon review of this disclosure. The scope of the invention should therefore be determined not with reference to the above description, but instead with reference to the appended claims along with their full scope of equivalents.

What is claimed is:

1. An immersive telepresence conferencing system, the system comprising:
   at least one processor;
   at least one camera, at least one display unit, at least one speaker, at least one microphone, and at least one network interface, each coupled to the at least one processor;
   a memory storing instructions executable by the at least one processor to cause the processor to:
   capture audio data via the at least one microphone;
   capture image data via the at least one camera;
   communicate at least some of the captured data to at least one remote endpoint via the network interface;
   receive image data and audio data from at least one remote source via the network interface;
   emit at least some of the received audio data via the at least one speaker; and
   render, via the at least one display unit, at least one depiction of at least one object, the size of the depiction corresponding substantially to the true size of the depicted object, based, at least in part, on at least some of the received image data,
   wherein, the at least one processor is housed in a first housing;
   the at least one camera, display unit, speaker, microphone, and network interface are housed in a second housing; and
   the at least one processor is detachably coupled, via a conferencing device, to the at least one camera, display unit, speaker, microphone, and network interface.

2. The immersive telepresence conferencing system of claim 1, wherein the least one remote source comprises the at least one remote endpoint.

3. The immersive telepresence conferencing system of claim 1, wherein the display unit comprises at least one projector.

4. The immersive telepresence conferencing system of claim 3, wherein the at least one projector is a pico-projector.

5. The immersive telepresence conferencing system of claim 3, wherein corresponding substantially to the true size of the object depicted comprises corresponding to at least 50% of the true size of the depicted object.

6. The immersive telepresence conferencing system of claim 5, wherein rendering the at least one depiction comprises rendering the at least one depiction on a surface, at least a portion of which is five to ten feet distant from the at least one projector.

7. The immersive telepresence conferencing system of claim 5, further comprising at least one sensor, and wherein the instructions are further executable to cause the processor to:
   determine, using the at least one sensor, a distance from the at least one projector to the surface; and
   automatically scale the rendering of the depicted object.

8. The immersive telepresence conferencing system of claim 7, wherein the depicted object comprises a far-end conference participant at the remote endpoint, the depiction of the conference participant forms an angle with the projector, and the size of the angle is less than or equal to ten degrees.

9. The immersive telepresence conferencing system of claim 8, wherein the size of the angle is less than or equal to five degrees.

10. An immersive telepresence conferencing system, the system comprising:
    at least one processor;
    at least one camera, at least one display unit, at least one speaker, at least one microphone, and at least one network interface, each coupled to the at least one processor;
    a memory storing instructions executable by the at least one processor to cause the processor to:
    capture audio data via the at least one microphone;
    capture image data via the at least one camera;
    communicate at least some of the captured data to at least one remote endpoint via the network interface;
    receive image data and audio data from at least one remote source via the network interface;
    emit at least some of the received audio data via the at least one speaker; and
    render, via the at least one display unit, at least one depiction of at least one object, the size of the depiction corresponding substantially to the true size of the depicted object, based, at least in part, on at least some of the received image data,
    wherein:
    the at least one processor is housed in a first housing;
    the at least one camera, display unit, speaker, microphone, and network interface are housed in a second housing; and
    the at least one processor is wirelessly coupled to the at least one camera, display unit, speaker, microphone, and network interface.

11. The immersive telepresence conferencing system of claim 10, wherein the least one remote source comprises the at least one remote endpoint.

12. The immersive telepresence conferencing system of claim 10, wherein the display unit comprises at least one projector.

13. The immersive telepresence conferencing system of claim 12, wherein the at least one projector is a pico-projector.

14. The immersive telepresence conferencing system of claim 12, wherein corresponding substantially to the true size of the object depicted comprises corresponding to at least 50% of the true size of the depicted object.

15. The immersive telepresence conferencing system of claim 14, wherein rendering the at least one depiction comprises rendering the at least one depiction on a surface, at least a portion of which is five to ten feet distant from the at least one projector.

16. The immersive telepresence conferencing system of claim 14, further comprising at least one sensor, and wherein the instructions are further executable to cause the processor to:
    determine, using the at least one sensor, a distance from the at least one projector to the surface; and
    automatically scale the rendering of the depicted far-end conference participant.

17. The immersive telepresence conferencing system of claim 16, wherein the depicted object comprises a far-end conference participant at the remote endpoint, the depiction of the conference participant forms an angle with the projector, and the size of the angle is less than or equal to ten degrees.

18. The immersive telepresence conferencing system of claim 17, wherein the size of the angle is less than or equal to five degrees.

19. The immersive telepresence conferencing system of claim 10, wherein:
   the first housing comprises a portable electronic device.

20. The immersive telepresence conferencing system of claim 19, wherein the portable electronic device comprises a laptop computer, a tablet computer, and smart phones.

\* \* \* \* \*